No. 841,524. PATENTED JAN. 15, 1907.
C. M. HOYT & M. J. McNULTY.
CATTLE GUARD.
APPLICATION FILED AUG. 29, 1906.
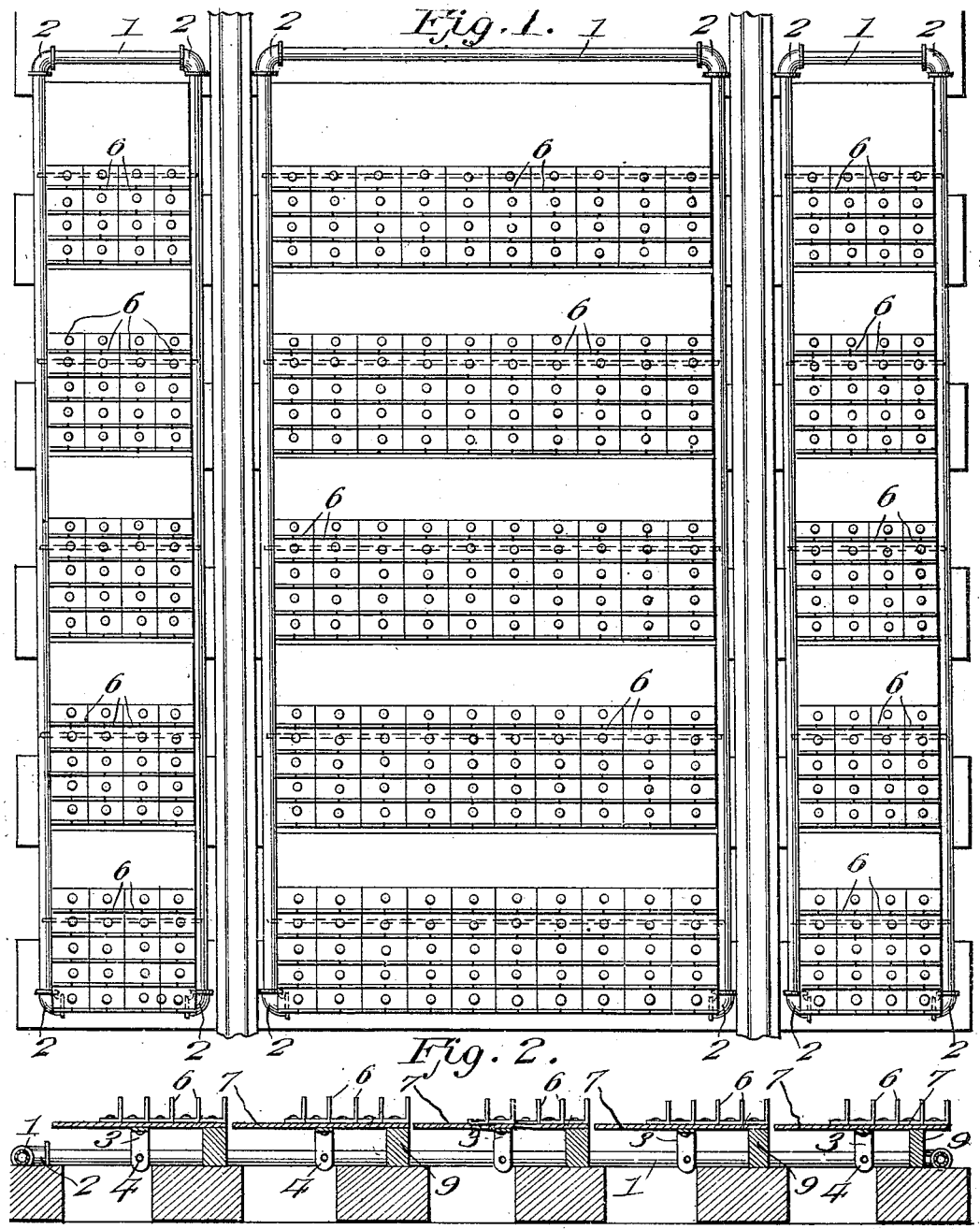
Witnesses
Frank B. Hoffman
Inventors
Charles M. Hoyt and
Michael J. McNulty,
By Victor J. Evans
Attorney

UNITED STATES PATENT OFFICE.

CHARLES M. HOYT AND MICHAEL J. McNULTY, OF ATOKA, INDIAN TERRITORY.

CATTLE-GUARD.

No. 841,524.     Specification of Letters Patent.     Patented Jan. 15, 1907.

Application filed August 29, 1906. Serial No. 332,553.

*To all whom it may concern:*

Be it known that we, CHARLES M. HOYT and MICHAEL J. McNULTY, citizens of the United States, residing at Atoka, District 23, Indian Territory, have invented new and useful Improvements in Cattle-Guards, of which the following is a specification.

This invention relates to cattle-guards; and one of the principal objects of the same is to provide reliable and efficient means for preventing cattle or animals from crossing a railway-track.

Another object of our invention is to provide such an arrangement that animals stepping upon a guard will not injure their hoofs, but will be thrown off by the pivoted section.

These and other objects are attained by means of the construction illustrated in the accompanying drawings, in which—

Figure 1 is a plan view of a cattle-guard made in accordance with our invention. Fig. 2 is a vertical sectional view of the same. Fig. 3 is a detail sectional view through one of the pivoted plates.

Referring to the drawings for a more particular description of the invention, the numeral 1 designates the frame of the guard, made of sections of gas-pipe united at the corners by elbow-fittings 2.

In carrying out our invention we use three sections or frames, one between the rails and one upon each side thereof. These frames are each made of gas-pipe and are of substantially the same construction, the difference being merely one of size or shape. The frames are properly secured to the ties between the track-rails and upon opposite sides thereof in any suitable manner, and to the frame-pipes are secured a series of upright supporting-flanges 3, pivotally connected at 4 and depending from sheet-metal strips which extend across the frame. Secured to the upper surface of said strips are the guard-plates 5, said guard-plates having upwardly-projecting points 6 and being supported upon plates 7, provided with plane surfaces at one side thereof and the opposite side resting upon bars 9, supported upon the ties.

Upon reference to Fig. 2 it will be seen that the weight of the guard-plates 5 is sufficient to throw the plate 7 into a horizontal position to rest upon the cross-bars 9, and when an animal steps on the plane portion it will be thrown downward and the prongs 6 will be thrown upward. When the animal removes his foot from the plane portion, the plate will again drop to its horizontal position to rest upon the cross-bars 9, as will be understood.

From the foregoing it will be obvious that a cattle-guard constructed as described will effectually prevent animals from crossing the tracks, owing to the fact that the pivoted plates will let the animal down and frighten it off. When the animal steps off of the plate, it will again assume a horizontal position.

Our invention may be manufactured at slight cost, can be quickly placed in position between the track-rails, and will be found a very durable and efficient device for its purpose.

Having thus described the invention, what we claim is—

1. A cattle-guard comprising a frame, supporting-flanges pivoted to said frame, plates secured to the flanged strips and provided with upwardly-projecting points or guards upon one side of said plate, substantially as described.

2. A cattle-guard comprising separate frames designed to be secured between the track-rails and at opposite outer sides thereof, said frames each having pivotally connected thereto a series of supporting-flanges, plates secured to the flanged strips and a series of pointed cattle-guards riveted to said plates upon one side thereof, for the purpose described.

In testimony whereof we affix our signatures in presence of two witnesses.

CHARLES M. HOYT.
MICHAEL J. McNULTY.

Witnesses:
LEWIS C. LE FLORN,
GORDON TUYER.